United States Patent [19]

Giezen et al.

[11] 4,189,942

[45] Feb. 26, 1980

[54] TEMPERATURE INDICATING DEVICE USING A PRESSURE SENSITIVE POLYISOBUTYLENE ADHESIVE SEAL

[75] Inventors: Egenius A. Giezen, Rheden; Gerrit D. B. van Houwelingen, Otterlo; Mariëtta Cramer, Arnhem, all of Netherlands

[73] Assignee: Akzona Incorporated, Asheville, N.C.

[21] Appl. No.: 896,114

[22] Filed: Apr. 13, 1978

[30] Foreign Application Priority Data

May 2, 1977 [NL] Netherlands ............... 7704765

[51] Int. Cl.² ............... G01K 11/08; G01K 11/12; B32B 3/26
[52] U.S. Cl. ........................... 73/356; 73/358; 116/216; 116/219; 428/164; 428/165; 428/336; 428/339; 428/462; 428/521; 428/913
[58] Field of Search ............ 23/253 TP; 73/356, 358; 116/114 AM, 114 V, 114.5; 156/145; 206/316, 459, 534; 252/408; 350/339, 343; 428/172, 173, 199, 203, 204, 205, 207, 209, 211, 461, 483, 913

[56] References Cited

U.S. PATENT DOCUMENTS

| | | | |
|---|---|---|---|
| 3,002,385 | 10/1961 | Wahl et al. ............. | 116/114 V |
| 3,704,985 | 12/1972 | Pickett et al. ........... | 73/356 |
| 3,765,243 | 10/1973 | Pickett et al. ........... | 73/356 |
| 3,826,141 | 7/1974 | Pickett et al. ........... | 73/356 |
| 3,922,917 | 12/1975 | Ayres ..................... | 73/356 |
| 3,946,612 | 3/1976 | Sagi et al. ............... | 73/356 |

OTHER PUBLICATIONS

Houwink et al., Adhesion and Adhesives, Elsevier Pub. Co., N.Y., vol. 2, 1967, p. 36.
Colour Index, 3rd Ed., vol. 3, 1971, pp. 3563, 3564, 3620, 3621, 3624, 3625, 3626, 3627, 3602, 3603, 3588, 3589, 3634, 3635.

*Primary Examiner*—Bruce H. Hess
*Attorney, Agent, or Firm*—Francis W. Young; David M. Carter

[57] ABSTRACT

There is provided a temperature indicating device such as a thermometer having a thermally conductive foil as a carrier layer, the carrier layer having one or more cavities formed by depression in the foil material. The depressions are filled with solid mixtures which melt at predetermined temperatures and are composed of ortho-chloronitrobenzene, ortho-bromonitrobenzene, and a dyestuff. A transparent cover layer seals the cavities and their contents. The transparent cover layer and carrier layer are bonded to each other by means of a pressure-sensitive adhesive which includes polyisobutylene.

23 Claims, 3 Drawing Figures

TEMPERATURE INDICATING DEVICE USING A PRESSURE SENSITIVE POLYISOBUTYLENE ADHESIVE SEAL

BACKGROUND OF THE INVENTION

This invention relates to a temperature indicating device. More particularly, it relates to a temperature indicating device which utilizes cavities filled with temperature sensitive materials which must be visibly sealed from their surrounding environment.

A temperature indicating device utilizing a thermally conductive foil as a carrier layer having a plurality of cavities formed by depressions in the material, each cavity being filled with mixtures of ortho-chloronitrobenzene, ortho-bromonitrobenzene and a dyestuff are described in copending U.S. patent application Ser. No. 896,115 filed Apr. 13, 1978 and assigned to Akzona Incorporated, assignee of this application. This temperature indicating device has never been applied in practice because no suitable adhesive agent was available with which the carrier layer and the cover layer could be bonded together without premature discoloration of the indicator layer. From the U.S. Pat. No. 3,002,385 temperature indicating devices are known in which use is made of a low-temperature bonding adhesive, such as an epoxy resin or a pressure-sensitive adhesive substance having a basis of silicones. For various reasons, such as insufficient resistance to the chemicals used, release of low-molecular constituents, which detrimentally affects durability, temperature indication and reproducibility, and the fact that they are insufficiently impervious to chemicals, said adhesives have been found to be unsuitable.

Owing to the lack of a suitable adhesive recourse was made in practice to the use of special constructions in which a shield was positioned between the fusible solid mixture and the indicator layer, which shield is removed just prior to use of the temperature indicating device. Such a construction is described in U.S. Pat. No. 3,677,088. Although such a temperature indicating device can very well be used, the above described shield causes production and use thereof to be complicated and expensive.

It has now been found that by choosing a special type of adhesive layer there is no longer need for the use of a shield.

OBJECTS OF THE INVENTION

It is one object of this invention to provide a temperature indicating device which is inexpensive and relatively uncomplicated.

It is another object of this invention to provide a temperature indicating device which does not need a shield.

It is another object of this invention to provide a temperature indicating device which utilizes a transparent cover layer over the temperature sensitive materials which is adhesively bonded rather than heat sealed.

It is a further object of this invention to provide an adhesively sealed temperature indicating device whereby the adhesive does not change the temperature indicating materials.

SUMMARY OF THE INVENTION

In accordance with one form of this invention there is provided a temperature indicating device including a thermally conductive foil as a carrier layer having one or more cavities formed by depressions in the foil material. At least one of the depressions is filled with a solid mixture which melts at a predetermined temperature; the mixture includes ortho-chloronitrobenzene and ortho-bromonitrobenzene. A dyestuff may be added to the mixture which is utilized as an indicator. A transparent cover layer seals the cavity and their contents. The transparent cover layer and the carrier layer are bonded to each other by means of an adhesive layer which includes a pressure-sensitive adhesive made at least in part of polyisobutylene.

The temperature indicating device according to the invention is of simple construction and has surprisingly good durability. Moreover, its indication of the temperature is accurate and reproducible.

It is preferred that the polyisobutylene used as pressure-sensitive adhesive should have an average molecular weight in the range of 50,000 to 5,000,000, more particularly 150,000 to 4,000,000.

A very favorable combination of adhesive strength and resistance to the chemicals present in the cavities is obtained if the adhesive layer consists of a mixture of 30–70% by weight of polyisobutylene having an average molecular weight of 70,000 to 100,000 and 70–30% by weight of polyisobutylene having an average molecular weight of 1,000,000 to 3,500,000. It is preferred that said mixture should consist of practically equal parts by weight of the respective constituents. The adhesion between carrier layer and pressure-sensitive adhesive can still by further improved in various ways. Such improvement is obtained if the carrier layer consists of aluminum foil having an etched surface.

Improvement of the adhesive strength can also be realized by making use of a carrier layer of aluminum foil coated with a polyisobutylene surface layer applied from a solution in an organic solvent.

As example of a suitable solvent hexane may be mentioned. It is preferred that such a surface layer should have a thickness of 2–10 microns. It is preferred that the polyisobutylene used for such a surface layer should have an average molecular weight in the range of 2,000,000 to 3,500,000. The use of a carrier layer having a surface thus modified makes it possible to obtain good adhesive strength also when employing polyisobutylene having a relatively high molecular weight. A carrier layer coated with a surface layer of polyisobutylene is therefore preferably used if the carrier layer is bonded to the transparent cover layer by means of a pressure-sensitive adhesive layer of polyisobutylene having an average molecular weight in the range of 2,000,000 to 3,500,000.

To promote durability of the temperature indicating device not only the use of polyisobutylene as adhesive layer is of decisive importance, but also the choice of the dyestuff to be used.

Particularly favorable results are obtained with a dyestuff selected from the group of dyestuff which in accordance with the Colour Index are preferred to as solvent blue 10, solvent blue 44, solvent blue 45, solvent blue 49, solvent blue 67, solvent red 90, solvent orange 59 and solvent green 19.

BRIEF DESCRIPTION OF THE DRAWINGS

The subject matter which is regarded as the invention is set forth in the appended claims. The invention itself, however, together with further objects and advantages thereof may be better understood by referring to the following description taken in conjunction with the accompanying drawings in which:

DESCRIPTION OF THE PREFERRED EMBODIMENTS

Figure 1:
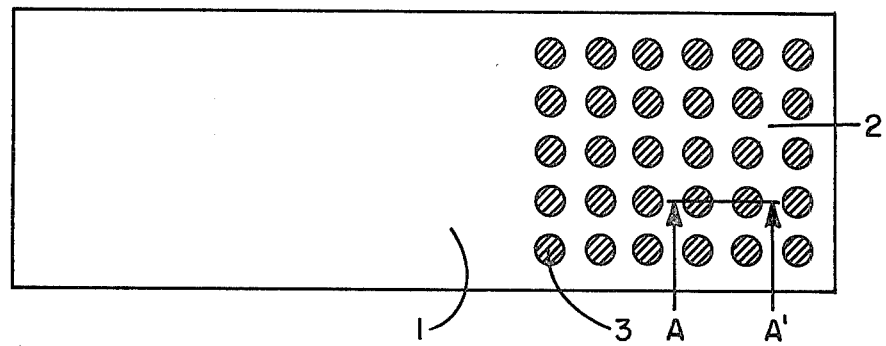
FIG. 1 is a plan view of a temperature indicating device according to one form of the invention.

In FIG. 1 the temperature indicating device has a portion 1 which serves as a handle and an indicator portion 2 adapted to be inserted into the mouth for oral temperature measurement. The indicator portion 2 is provided with a number of suitably spaced cavities 3. Each cavity is filled with a solid mixture 4 (FIGS. 2 and 3) which melts at a known temperature. In the adjacent cavities the melting temperature may for instance be 0.1° C. higher or lower, which can be realized by a proper choice of the composition of the solid mixture.

Although in FIG. 1 a series of cavities 3 are shown, there is only need for one cavity if the temperature indicating device is used to establish whether or not a certain temperature value has been exceeded. The cavities 3 are formed by depression of the thermally conductive foil, which serves as carrier layer 5. Although the thermally conductive foil may very well be of aluminium, also other flexible thermally conductive materials may be used. On the solid mixture 4 and in intimate contact therewith is an indicator layer 6 of absorbent material, which is usually an absorbent paper having a high porosity and a high absorptivity, so that when the solid mixture melts, the indicator layer is immediately wetted by the liquid phase formed. A transparent cover layer 7 seals the cavities 3 and their contents. The cover layer 7 is of film material which is sufficiently impervious to the substances present in the cavities, and to substances, for example moisture, which may unfavorably influence temperature indication. It is preferred that the transparent cover layer should be of polyester, more particularly of the polyethylene terephthalate type. The thickness of the transparent cover layer is preferably 20–100 microns.

Figure 2:
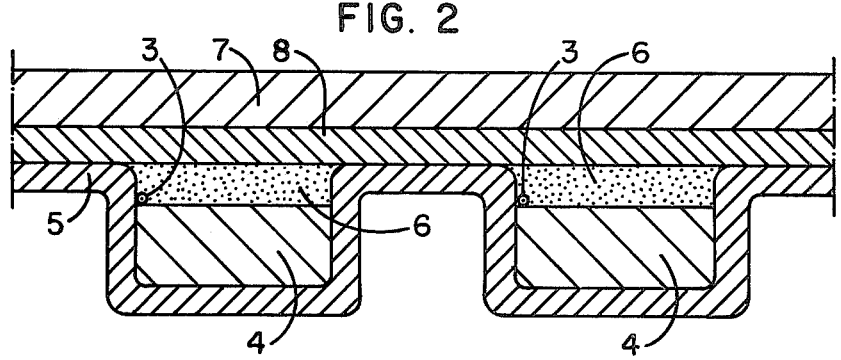
FIG. 2 is a vertical section along line A-A' given in FIG. 1.

In FIG. 2 the cover layer 7 is bonded to the carrier layer 5 by an adhesive layer 8. This adhesive layer 8 consists of a pressure-sensitive adhesive which is entirely or substantially of polyisobutylene and can be applied to the carrier layer 5 without the melt temperature of the solid mixtures in the cavities being exceeded.

Figure 3:
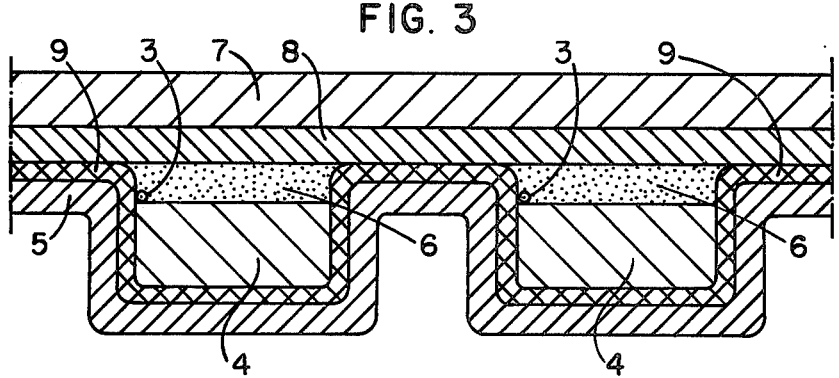
FIG. 3 is a vertical section of an alternative embodiment along line A-A' in FIG. 1.

In FIG. 3 the carrier layer 5 is still provided with a surface layer 9 of polyisobutylene. The latter serves to improve the adhesion between the pressure-sensitive polyisobutylene of the adhesive layer 8 and the material of the carrier layer 5. The surface layer 9 is generally obtained by providing the carrier layer material with a thin coat of a solution of polyisobutylene in an organic solvent, for instance hexane, and subsequently allowing the solvent to evaporate.

The FIGS. 1, 2 and 3 show special embodiments of the temperature indicating device according to the invention. It will be clear that within the scope of the invention it is possible for a man skilled in the art to realize many other embodiments and/or modifications. The nature of the thermally conductive material for the carrier layer, the number, the dimensions and the arrangement of the cavities provided therein, the weight ratio of ortho-chloronitrobenzene and ortho-bromonitrobenzene in the solid mixture and the choice of the material of the transparent cover layer can immediately be derived from the state of the art by a man skilled in the same art. The same applies to the amount of the solids mixture in each of the cavities and the way of filling the cavities. The respective data are known from, for instance, the Netherlands patent application No. 7 110 118.

When use is made of the temperature indicating device according to the invention, the melt temperature of the solid mixture will be exceeded in one or more cavities, depending on the level of the temperature to be measured, so that the respective mixture will pass from the solid into the liquid state. The liquid formed is then sucked up by the absorbent material of the indicator layer. The dyestuff contained in the liquid causes a visually perceptible discoloration of the indicator layer. From the position of the border between cavities having a colored and those not having a colored indicator layer immediately the value of the temperature to be determined can be read. The pressure-sensitive adhesive to be used according to the invention can be applied as thin layer to one side of the film material used as transparent cover layer, for instance polyester film. This may be done from a solution in, for instance, hexane or from the melt. The thickness of the adhesive layer thus formed is as a rule 10–100 microns, and preferably 20–60 microns.

The polyisobutylene-coated side of the transparent cover layer is brought into contact with the carrier layer on the side where the cavities to be closed off are positioned, and bonded to it under pressure without the temperature being increased.

The bonding pressure applied is generally in the range of 1 to 50 kg/cm².

Various types of polyisobutylene are suitable to be used for this purpose. It is preferred that the average molecular weight of the polyisobutylene should be in the range of 50,000 to 5,000,000. By average molecular weight is to be understood the viscosity average molecular weight. This is calculated from the intrinsic viscosity, which in its turn is determined from the rate of flow of a solution having a concentration of 1 g/dl in isooctane through the capillary of an Ubbelohde viscometer at a temperature of 20° C. For the calculation the following formula is used:

$$[n] = \frac{n_{sp}/c}{1 + 0.31\, n_{sp}} = 3.06 \times 10^{-4} \times \overline{M}_v\, 0.65$$

where:

[n] = intrinsic viscosity $n_{sp} = t/t_o - 1$ = specific viscosity t = rate of flow of the solution, corrected in accordance with Hagenbach-Couette $t_o$ = rate of flow of the solvent, corrected in accordance with Hagenbach-Couette c = concentration of the solution in g/dl $\overline{M}_v$ = average molecular weight Polyisobutylene having a relatively low average molecular weight of for instance below 150,000, has excellent adhesive strength. Under some circumstances, however, this material tends to accumulate in the indicator cavities as a result of viscous deformation.

In that case it will be preferred to employ a polyisobutylene having a higher molecular weight, for instance in the range of 150,000 to 4,000,000. As the adhesive strength decreases with increasing molecular weight, it will be of advantage to make use of a mixture of a low-molecular and a high-molecular weight polyisobutylene. On the one hand such a mixture has good adhesive strength, and on the other hand, it is not subject to viscous deformation. In the preferably used mixture 30-70% by weight of the polyisobutylene has an average molecular weight in the range of 70,000 to 100,000 and 70-30% an average molecular weight in the range of 1,000,000 to 3,500,000.

Particularly preferred is a mixture in which said components are present in practially equal parts by weight. The adhesive strength is further improved by choosing as carrier layer an aluminium foil whose adhesive side has a smooth surface which has previously been etched in a known manner to remove the oxide skin present on it. In order to further improve the adhesion between the carrier layer and the polyisobutylene adhesive layer, particularly with polyisobutylene having a relatively high molecular weight, the material of the carrier layer is previously provided with a thin surface layer of polyisobutylene whose average molecular weight is in the range of preferably 2,000,000 to 3,500,000. The most favorable results are obtained if such a layer has a thickness of 2-10 microns.

This surface layer is applied from a solution. A surface layer thus obtained is brought into contact with the adhesive layer of polyisobutylene with which the transparent cover layer is provided. By pressing together the cover layer and the carrier layer for a short time at room temperature the two polyisobutylene layers will be caused permanently and satisfactorily to adhere to each other. It should be added that the Japanese Patent Application No. 75020580 describes the use as pressure-sensitive adhesive of polyisobutylene is adhesive tape. Its use in temperature indicators, however, is not mentioned in it. The used dyestuffs are dissolved in mixtures of ortho-chloronitrobenzene and ortho-bromonitrobenzene in an amount which is usually about 0.05-0.2% by weight.

The dyestuffs that are preferably used are referred to under the names mentioned in the Colour Index, 3rd Edition (1971), published by The Society of Dyers and Colourists, Great Britain (five volumes).

Solvent blue 10 is marketed for instance by the firm of Sandoz, Switzerland, under the trade name savinyl blue B.

Solvent blue 44 is marketed for instance by the firm of Sandoz under the trade name savinyl blue GLS.

Solvent blue 45 is marketed for instance by the firm of Sandoz under the trade name savinyl blue RS.

Solvent blue 49 is marketed by the firm of Ciba-Geigy, Switzerland, under the trade name orasol blue BLN.

Solvent blue 67 is marketed by Ciba-Geigy under the trade name orasol blue GN.

Solvent red 90 is marketed by the firm of Sandoz under the trade name savinyl red BLSN.

Solvent orange 59 is marketed for instance by Ciba-Geigy under the trade name orasol orange RLN.

Solvent green 19 is marketed for instance by the firm of Sandoz under the trade name savinyl green B.

The dyestuffs used according to the invention are remarkable, particularly for the speed at which they migrate from the solid mixture to the indicator layer. This means that there is no premature discoloration of the indicator layer, in spite of the fact that the indicator layer and the dyestuff-containing solid mixture are constantly in contact with each other also during storage.

Moreover, the above-mentioned dyestuffs are inert to polyisobutylene. They are therefore excellently suitable to be used in combination with polyisobutylene as pressure-sensitive adhesive.

All solid mixtures that are present in the various cavities of the temperature indicating device may contain one and the same dyestuff. It is also possible to use different dyes. For instance, the use of a blue dyestuff may be combined with that of a red one to clearly indicate that a particular temperature value is exceeded.

Suitable materials for the indicator layer are cellulose paper and paper from synthetic starting materials, for instance polyester. It is preferred that the paper used should be opaque, have a uniform structure and evenly discolor upon getting into contact with the melted solid mixture.

It has been found that these requirements are fully met by coarse filter paper (No. 589') supplied by the firm of Schleicher & Schüll and by chromatography paper No. 1 supplied by the firm of Whatman. The transparent cover layer consists of a material which does not change the melting point of the solid mixture contained in the cavities, and is not adversely affected by said mixture and is sufficiently impervious to the various substances. It is preferred that the transparent layer should consist of polyester film, for instance Melinex film supplied by I.C.I., Great Britain. Bonding the transparent cover layer to the carrier layer should be carried out at such a low temperature that the melting temperature of the solid mixtures present in the cavities is not exceeded. The cavities must then be insulated from each other as well as from the ambient air. The polyisobutylene used has a good resistance to the chemical substances present in the cavities, does not influence their melting point, and hardly absorbs chemical substances and does not allow the passage thereof.

The temperature indicating device according to the invention is particularly suitable to be applied as disposable thermometer for single clinical use. As the temperature indication is irreversible, it should be taken care that prior to actual use, for example during transport and storage, the temperature indicating device is protected from exposure to temperatures which are higher than the temperature to be measured. The invention will be further described in the following examples.

EXAMPLE 1

A transparent polyester film (Melinex, supplied by I.C.I.) provided with an adhesive layer of polyisobutylene is pressed together with an aluminium layer foil. As a measure of the adhesive strength is taken the force in g/cm which is required to peel the polyester film off the aluminium foil at a rate of 30 cm/minute. This force should be at least about 150 g/cm. The influence on the magnitude of the peeling force has been investigated of the nature of the aluminium surface (rough, smooth, etched), the type of polyisobutylene (molecular weight, mixture) and bonding pressure (5 and 50 kg/cm$^2$). The polyisobutylene types used have been obtained from BASF, Ludwigshafen, West Germany, and are marketed under the trade name Oppanol. The results are listed in Table I.

TABLE I

| Pretreatment of aluminium foil | Peeling force in g/cm | | | | | | | | | |
|---|---|---|---|---|---|---|---|---|---|---|
| | PIB1 | | PIB2 | | PIB3 | | PIB4 | | PIB5 | |
| | A | B | A | B | A | B | A | B | A | B |
| rough surface[1] | 550 | 600 | 400 | 600 | 100 | 150 | 20 | 20 | 400 | 450 |
| smooth surface | 600 | 600 | 600 | 600 | 150 | 200 | 100 | 130 | 400 | 450 |
| etched:[2] | | | | | | | | | | |
| rough surface | 600 | 600 | 600 | 600 | 100 | 240 | 40 | 120 | — | — |
| smooth surface | 600 | 600 | 600 | 600 | 250 | 330 | 200 | 300 | — | — |
| coated:[3] | | | | | | | | | | |
| rough surface | 400 | 400 | 400 | 400 | 400 | 400 | 400 | 400 | — | — |
| smooth surface | 300 | 300 | 300 | 300 | 300 | 300 | 300 | 300 | — | — |

A = used bonding force 5 kg/cm$^2$
B = used bonding force 50 kg/cm$^2$
[1]rough surface: mechanically roughened
[2]etched: pretreatment with a solution of sodium metasilicate in water
[3]coated: surface layer Oppanol B150, thickness 5$\mu$.
PIB1: Oppanol B15, average mol. wt. 77–92 · 10$^3$
PIB2: Oppanol D3061, average mol. wt. about 140 · 10$^3$
PIB3: Oppanol B50, average mol. wt. 340–480 · 10$^3$
PIB4: Oppanol B150, average mol. wt. 2.3–3 · 3 · 10$^6$
PIB5: mixture of Oppanol B15/B150 (1:1)

EXAMPLE 2

Of polyisobutylene the permeability is investigated for the chemicals used in the temperature indicating device. Polyisobutylene films are formed from a solution disposed on paper. The films thus obtained are made into bags of about 60 cm$^2$ which are filled with 2.5 grams of a mixture of ortho-chloronitrobenzene and ortho-bromonitrobenzene (weight ratio 38:62) and sealed. After being weighed, the bags are stored at 32° C. in a room with air circulation and after different periods the loss of weight is determined. The results are summarized in Table II.

TABLE II

| Sample | Loss of weight in mg/h/$\mu$/cm$^2$ |
|---|---|
| PIB1 | 0.12 |
| PIB2 | 0.14 |
| PIB3 | 0.17 |
| Surlyn 1652 (control) | 1.05 |

The designations PIB1, PIB2 and PIB3 have the same meaning as in Example 1. For comparison also mention is made of the result obtained with a film (thickness about 45$\mu$) of an ionomeric adhesive Surlyn 1652. It appears that the polyisobutylene samples are far less permeable than the ionomeric adhesive which falls outside the scope of the present invention.

EXAMPLE 3

Cavities formed in an aluminium carrier layer are filled with mixtures of ortho-chloronitrobenzene and ortho-bromonitrobenzene and sealed with a cover layer of polyester film provided with a polyisobutylene adhesive layer. The test objects thus obtained are stored at 20° C. and 32° C. and examined under a stereo microscope to establish whether the chemicals dissolve in the adhesive layer, disappear from their cavities or become liquid. Observations were taken for 40 days. The results are given in Table III.

TABLE III

| Sample | Observations |
|---|---|
| PIB1 | After a few days viscous deformation of the glue layer occurs at 20° C. No leaking away or dissolving of the chemicals after 40 days at 32° C. |
| PIB2 | After a few days viscous deformation of the glue layer occurs at 20° C. No leaking away or dissolving of the chemicals after 40 days at 32° C. |
| PIB3 | After a few days slight viscous deformation of the polyisobutylene occurs at 20° C. At the end of the observation period some leaking away of the chemicals as a result of the polyisobutylene becoming detached from the aluminium. |
| PIB4 | After 40 days at 32° C. no viscous deformation occurs. No leaking away or dissolving of chemicals in those places where the adhesion between aluminium and polyisobutylene has been maintained. In a few places the polyisobutylene layer has become detached from the aluminium and chemicals have leaked away there. |

From this table it appears that the chemicals neither leak away nor dissolve, provided that the adhesion to the aluminium foil is kept up. High-molecular weight polyisobutylene (PIB4) is the least liable to viscous deformation.

EXAMPLE 4

In this example the reproducibility of the temperature indication is demonstrated. A number of cavities formed in an aluminium carrier layer are filled with a series of mixtures of ortho-chloronitrobenzene, ortho-bromonitrobenzene and 0.1% by weight of orasol blue BLN (solvent blue 49), whose melting temperatures progressively increase by 0.1° C. The cavities thus filled are covered with Whatman chromatography paper No. 1 and subsequently sealed with a polyester film (Melinex) provided with a pressure-sensitive adhesive layer of polyisobutylene. The polyisobutylene used is a mixture of equal parts of Oppanol B15 (average molecular weight 77,000–92,000) and Oppanol B100 (average molecular weight 1.08–1.46×10$^6$). The test objects are stored at 28° C. and after 3, 7 and 10 weeks, respectively, placed in a water bath of a particular temperature to measure the temperature at which discoloration of the indicator layer takes place. The results obtained as average values of 4 temperature indicating devices are listed in Table IV.

TABLE IV

| | Temperature at which discoloration occurs (°C.) |
|---|---|
| after 0 weeks | 36.40 |
| 3 weeks | 36.45 |
| 7 weeks | 36.48 |
| 10 weeks | 36.50 |

It appears that the temperature indication as a function of time does not or hardly undergo any change.

EXAMPLE 5

A number of known adhesives with which an adhesive layer can be formed at room temperature are examined in the way described in Example 3. The aluminium foil used has previously been etched. From the results summarized in Table V it appears that the adhesives examined, which all fall beyond the scope of the present invention, none are suitable to be used for the present purpose envisaged.

TABLE V

| Adhesive | Solvent | Cover layer | Curing or drying time (min.) | Observations |
|---|---|---|---|---|
| Epoxide Silgrip 574 of curing time: coating thickness 10μ Ceta Bever | none | polyester | 3–14 | 3–6 min.: chemicals turn liquid<br>13–14 min.: poor adhesion to aluminium<br>3–13 min.: after 2 days at 32° C. chemicals have disappeared (dissolved in adhesive layer) |
| Epoxide coating thickness 10μ Araldite Ciba-Geigy | none | polyester | 5–45 | influence of curing time:<br>5–25 min.: chemicals turn liquid<br>25–35 min.: after 4 days at 20° C. yellowing and disappearing of chemicals |
| bi-component polyurethane Adcote 301A/350 Morton-Williams PUR 2837 Ciba-Geigy | methyl-ethyl ketone | polyester | solvent evaporated at 50° C. | influence of drying time:<br>2.5–4.5 hours: after 4 days at 32° C. chemicals disappear<br>>4.5 hours: poor adhesion to aluminium |
| Silicone RTV 108 General Electric is affected by moisture | none | cellophane | 0–45 | 0–30 min.: chemicals turn liquid<br>45 min.: poor adhesion to aluminium<br>30–45 min.: after 7 days at 20° C. chemicals disappear |
| Silgrip 574 General Electric pressure-sensitive glue (silicones) | none | polyester | none | after 3 days at 20° C.:chemicals turn liquid and dissolve in the glue layer |
| polyvinyl alcohol Elvanol 71–30 Du Pont | water | cellophane | solvent evaporated at 20° C. | after the water had been entirely removed, adhesion between polyvinyl alcohol and aluminium was insufficient with all samples |

From the foregoing description of the embodiments of the invention it will be apparent that many modifications may be made therein. It will be understood that these embodiments of the invention are intended as an exemplification of the invention only, and the invention is not limited thereto. For example, the indicator layer 6 may be omitted for certain dyes. It is to be understood therefore that it is intended the appended claims to cover all such modifications which fall within the true scope and spirit of the invention.

What is claimed is:

1. A temperature indicating device comprising
   (a) a thermally conductive foil as a carrier layer provided with one or more cavities formed by depressions in the foil material, at least one of which depressions is filled with a solid mixture which melts at a predetermined temperature and includes ortho-chloronitrobenzene, ortho-bromonitrobenzene and a dyestuff, and
   (b) a transparent cover layer sealing said cavities and their contents, characterized in that said transparent cover layer and said carrier layer are bonded to each other by means of an adhesive layer of a pressure-sensitive adhesive, said adhesive being substantially polyisobutylene.

2. A temperature indicating device according to claim 1, characterized in that the average molecular weight of said polyisobutylene is in the range of 50,000 to 5,000,000.

3. A temperature indicating device according to claim 2, characterized in that the average molecular weight of said polyisobutylene is in the range of 150,000 to 4,000,000.

4. A temperature indicating device according to claim 2, characterized in that said adhesive layer includes a mixture of 30–70% by weight of polyisobutylene having an average molecular weight in the range of 70,000 to 100,000 and 70–30% by weight of polyisobutylene having an average molecular weight in the range of 1,000,000 to 3,500,000.

5. A temperature indicating device according to claim 4, characterized in that said adhesive layer includes practically equal parts by weight of polyisobutylene having an average molecular weight in the range of 70,000 to 100,000 and polyisobutylene having an average molecular weight in the range of 1,000,000 to 3,500,000.

6. A temperature indicating device according to claim 1, characterized in that said carrier layer includes aluminium foil having an etched surface.

7. A temperature indicating device according to claim 6, characterized in that said carrier layer includes aluminium foil provided with a polyisobutylene surface layer applied from a solution in an organic solvent.

8. A temperature indicating device according to claim 7, characterized in that said polyisobutylene surface layer applied to the carrier layer has a thickness of 2 to 10 microns.

9. A temperature indicating device according to claim 7, characterized in that said surface layer applied to the carrier layer is of polyisobutylene having an average molecular weight in the range of 2,000,000 to 3,500,000.

10. A temperature indicating device according to claim 9, characterized in that said carrier layer provided with a polyisobutylene surface layer is bonded to the transparent cover layer by means of a pressure-sensitive adhesive layer of polyisobutylene having an average molecular weight in the range of 2,000,000 to 3,500,000.

11. A temperature indicating device according to claim 1, characterized in that said dyestuff is selected from the group of dyestuffs which in accordance with the Colour Index are referred to as solvent blue 10, solvent blue 44, solvent blue 45, solvent blue 49, solvent blue 67, solvent red 90, solvent orange 59 and solvent green 19.

12. A temperature indicating device according to claim 1, further including an indicator layer of absorbent material superimposed on the solid mixture.

13. A temperature indicating device comprising
(a) a thermally conductive foil as a carrier layer provided with one or more cavities formed by depressions in the foil material, at least one of which depressions is filled with a solid mixture which melts at a predetermined temperature and includes ortho-chloronitrobenzene, ortho-bromonitrobenzene and a dyestuff, and
(b) an indicator layer of absorbent material superimposed on the solid mixture, and
(c) a transparent cover layer sealing the cavities and their contents, characterized in that the transparent cover layer and the carrier layer are bonded to each other by means of an adhesive layer of a pressure-sensitive adhesive, said adhesive being substantially polyisobutylene.

14. A temperature indicating device according to claim 13, characterized in that the average molecular weight of the polyisobutylene is in the range of 50,000 to 5,000,000.

15. A temperature indicating device according to claim 14, characterized in that the average molecular weight of the polyisobutylene is in the range of 150,000 to 4,000,000.

16. A temperature indicating device according to claim 14, characterized in that the adhesive layer includes a mixture of 30-70% by weight of polyisobutylene having an average molecular weight in the range of 70,000 to 100,000 and 70-30% by weight of polyisobutylene having an average molecular weight in the range of 1,000,000 to 3,500,000.

17. A temperature indicating device according to claim 16, characterized in that the adhesive layer consists of practically equal parts by weight of polyisobutylene having an average molecular weight in the range of 70,000 to 100,000 and polyisobutylene having an average molecular weight in the range of 1,000,000 to 3,500,000.

18. A temperature indicating device according to claim 13, characterized in that the carrier layer consists of aluminium foil having an etched surface.

19. A temperature indicating device according to claim 18, characterized in that the carrier layer consists of aluminium foil provided with a polyisobutylene surface layer applied from a solution in an organic solvent.

20. A temperature indicating device according to claim 19, characterized in that the polyisobutylene surface layer applied to the carrier layer has a thickness of 2 to 10 microns.

21. A temperature indicating device according to claim 19, characterized in that the surface layer applied to the carrier layer is of polyisobutylene having an average molecular weight in the range of 2,000,000 to 3,500,000.

22. A temperature indicating device according to claim 21, characterized in that the carrier layer provided with a polyisobutylene surface layer is bonded to the transparent cover layer by means of a pressure-sensitive adhesive layer of polyisobutylene having an average molecular weight in the range of 2,000,000 to 3,500,000.

23. A temperature indicating device according to claim 13, characterized in that the dyestuff is selected from the group of dyestuffs which in accordance with the Colour Index are referred to as solvent blue 10, solvent blue 44, solvent blue 45, solvent blue 49, solvent blue 67, solvent red 90, solvent orange 59 and solvent green 19.

* * * * *